May 28, 1957
J. W. TOLAND
2,793,878
LOAD DISTRIBUTING TRAILER HITCH
Filed July 26, 1954
2 Sheets-Sheet 2
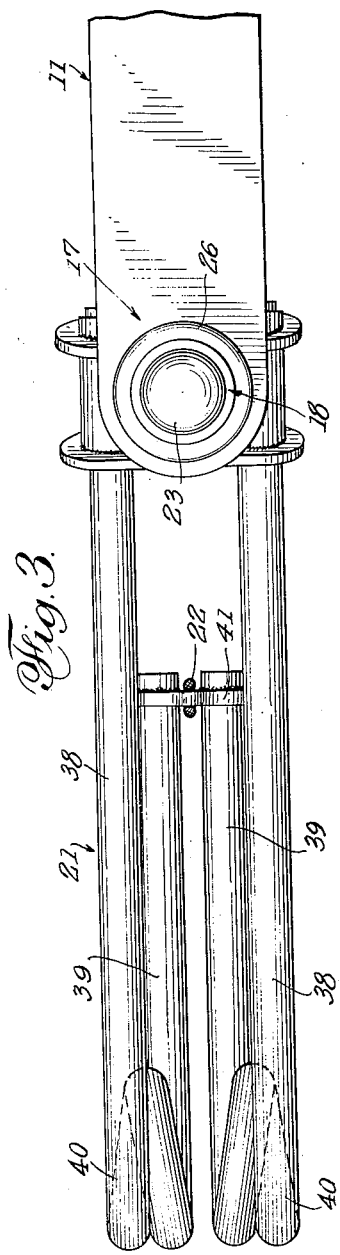
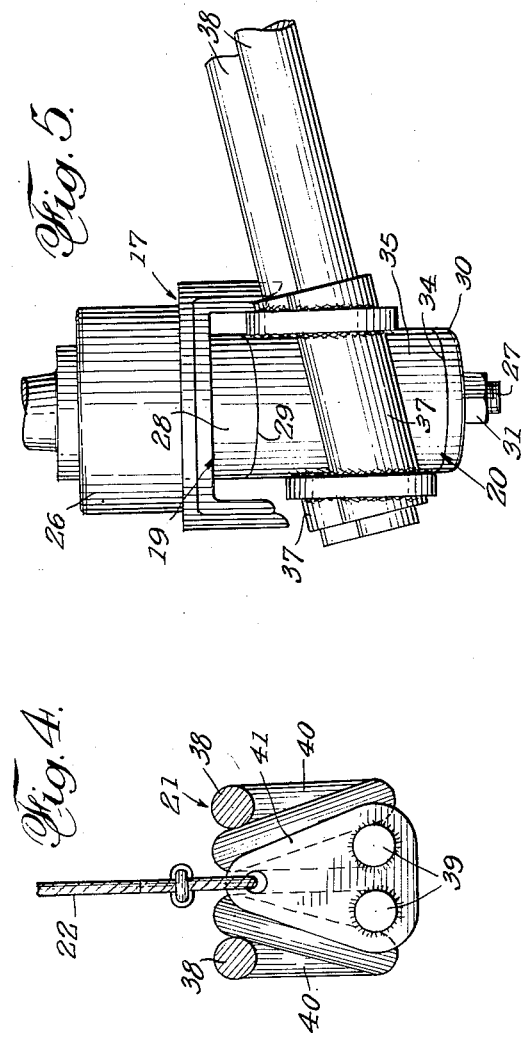
INVENTOR.
JOSEPH W. TOLAND
BY C. G. Stratton
ATTORNEY United States Patent Office 2,793,878
Patented May 28, 1957

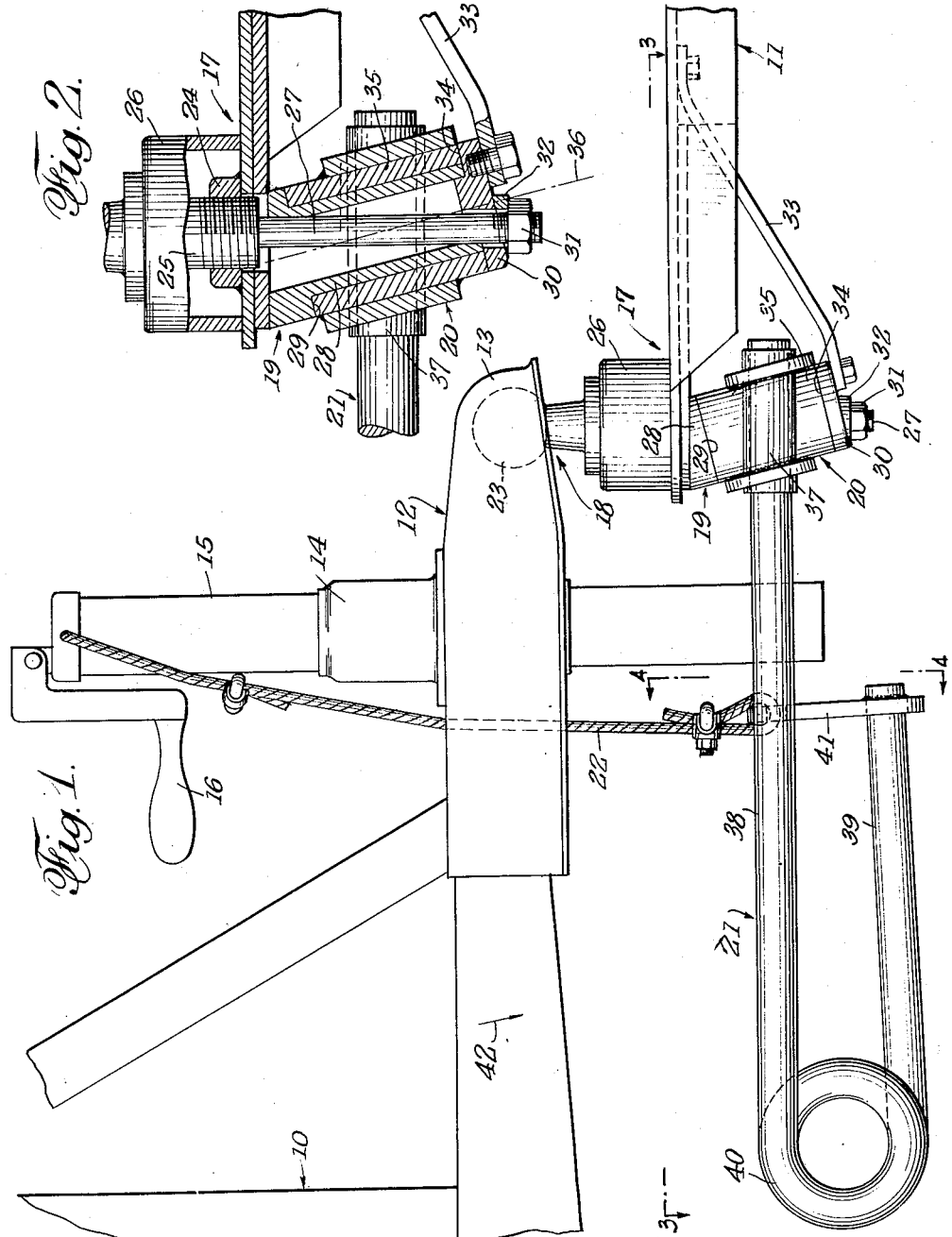

2,793,878

LOAD DISTRIBUTING TRAILER HITCH

Joseph W. Toland, Alhambra, Calif.

Application July 26, 1954, Serial No. 445,619

10 Claims. (Cl. 280—406)

This invention relates to a hitch for connecting a towing vehicle and a trailer and deals more particularly with a hitch construction that provides an improved distribution of the load that a two-wheeled trailer imposes on its towing vehicle.

Two-wheeled or tandem-wheeled trailers are usually balanced so that a portion of the load thereof is carried by the towing vehicle and particularly impose this load on the rear wheels of said towing vehicle. This loading frequently so depresses the rear of the towing vehicle as to materially impair its riding properties and, therefore, is sometimes offset, in part, by stiffening or strengthening the rear springs with the result that said vehicle, when used apart from the trailer, is hard riding.

Accordingly, an object of the present invention is to provide a new and improved trailer hitch that distributes part of the trailer load or weight from the rear of the towing vehicle to a forward portion, so that such weight is partly imposed on the front springs and wheels of said vehicle. This makes it possible for the towing vehicle to ride in a more nearly level position.

When making a turn, a tow vehicle and its two-wheeled trailer impose a torsion or twist on the connecting hitch that produces a tipping force on said vehicle or trailer or both. Unless turns are made at extremely low speeds, such tipping force may become material and, frequently, dangerous.

Another object of the invention, therefore, is to provide a trailer hitch that eases the loading on the towing vehicle, as it turns a corner, and thereby counteract the torsion force that produces tipping.

A further object of the invention is to provide a trailer hitch, as above contemplated, that keeps a constant spring pressure on the hitch joint while the vehicle and trailer are negotiating bumps, etc.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a side elevational view showing the present hitch in operative arrangement.

Fig. 2 is an enlarged vertical sectional view thereof.

Fig. 3 is a plan view, the same being taken on line 3—3 of Fig. 1.

Fig. 4 is a cross-sectional view as taken on line 4—4 of Fig. 1.

Fig. 5 is an end view of the hitch in the position assumed when a towing vehicle and its trailer are at right angles rather than in line as in Fig. 1.

In the drawings, the forward end of a two-wheeled trailer is represented by the numeral 10 and the rearward end of a towing vehicle by the numeral 11, in this case a channel member rigidly affixed to the vehicle in any suitable manner. In a generally conventional manner, the trailer 10 is provided with a forwardly extending draw bar 12 in which is embodied a hitch ball socket 13. The draw bar that is shown is one now in common use and the same is provided with a fixed guide 14 in which a vertically disposed jack shaft 15 is movable vertically under control of suitable gearing (not shown) and operating handle 16 (shown in folded, non-operable position). The jack shaft 15 is ordinarily used to raise and lower the forward portion of the trailer with respect to a castor wheel carried by the lower end of said jack shaft and which is omitted from the present hitch construction.

The above-described draw bar and jack are intended only as exemplary of means to effect connection with the present hitch 17 and may be varied providing the same embody a hitch ball socket and a means, of which jack 15 is an example, to produce the hereinafter-described spring loading.

The hitch 17 comprises, generally, a hitch ball unit 18 fixedly carried by the channel member 11 and engaged in socket 13, a downwardly and forwardly tilted swivel support 19 also carried by said channel member 11, a swivel 20 rotational around said support 19, spring means 21 carried by said swivel, and a flexible connection 22 connecting said spring means and the jack 15 on the draw bar.

The hitch ball unit 18 is here shown as a hitch ball 23 that is affixed to a nut 24 on the end of bar member 11 as by means of a threaded shank 25. A cup-like housing 26 on unit 18 encloses said nut and shank connection. A stem 27 extends downwardly from shank 25, as best seen in Fig. 2.

The swivel support 19 comprises a tubular core 28 affixed by bolt 27 to member 11 and disposed at an angle inclined to the vertical to provide the above mentioned downward and forward tilt or slope. Said support 19 is provided with a downwardly facing annular shoulder 29, and the outer surface of core 28 is cylindrical. Said support further includes a cap 30 fitted to the lower end of core 28 and held in place by a nut 31 on the lower end of bolt 27. Since said bolt 27 is vertical and cap 30 normal to the sloping core 28, a wedge-shaped washer 32 is interposed between said nut and the cap. If desired, said support 19 may be renederd more rigid by a strap or strut 33 that interconnects cap 30 and the member 11. Held thus rigid, said cap provides an upwardly facing annular shoulder 34 that is parallel to shoulder 29.

The swivel 20 comprises a sleeve or tube 35 rotationally mounted on core 28 between shoulders 29 and 34, the same being rotatable on the sloping axis of support 19 designated by numeral 36. On opposite sides, said tube 35 is provided with guide tubes 37 that are arranged at such an angle to said axis 36 that when directed front to rear, as in Figs. 1, 2 and 3, the same are horizontal or substantially so. Thus, said guide tubes 37 and the swivel tube 35 include an angle that is the complement of the ange between axis 36 and the vertical. It will be evident that the mentioned horizontal disposition of tubes 37 changes to an increasingly greater upward tilt as the tube 35 is rotated around core 28. As shown in Fig. 5, said upward tilt is equal to the angle of the axis 36 when the rotation equals ninety degrees.

From the foregoing, it will be seen that if the angle of axis 36 is 10° from the vertical, for example, the included angle between the axial center of tube 35 and the axes of tubes 37 will be 80°, and the angular disposition of tubes 37 when tube 35 has been rotated 90° will be 10° to the horizontal. Because of the slope of the tube 35, in the position of Fig. 5, tubes 37 will be at different levels with respect to the horizontal, substantially as shown.

The spring means 21 comprises two similar U-shaped or hairpin type springs, each having a long leg 38, a short leg 39, and a one and one-half turn eye 40 from which said legs extend. The long legs 38 extend telescopically into guide tubes 37 with the eyes 40 rearward of the hitch ball and of the jack 15 of draw bar 12. The short legs 39 are of a length to bring their ends slightly rearward of jack 15. Said four legs are preferably parallel. A link 41 rigidly connects legs 39 in spaced side-by-side relation, as shown in Figs. 3 and 4. Thus, said link 41 constitutes an element that effects common connection of the two springs that comprise spring means 21. Said spring legs may flex, not only around eyes 40, but also along their own length and the compound spring arrangement enables the provision of suitable spring tension with use of relatively small-sectioned spring elements.

The connection 22 is shown as a cable that interconnects the upper end of jack 15 and the link 41.

Since the trailer 10 is loaded in the direction of arrow 42, the draw bar 12 will bear down on hitch ball 23 and, through member 11, impose this force or weight on the rear springs and wheels of the towing vehicle and, thereby, depress said springs. In order to offset the above, the jack handle 16 is used to upwardly project jack 15 relative to draw bar 12 and, by means of cable connection 22 to place tension, of a degree desired, on spring means 21. This results in a resilient lift on member 11 that is opposed to the weight of trailer 10 as gravitationally applied in direction of arrow 42. It follows, therefore, that the front springs and wheels of the towing vehicle assume a portion of the load represented by arrow 42 and there is an improved distribution of said load to the four wheels of the vehicle.

Because of the above spring loading and the substantial elasticity resulting from the long spring design of means 21, and also the eyes of said means, movement over the dips and bumps in a roadway is eased considerably.

The spring means 21, although under tension, maintains a substantially horizontal position which the tow vehicle and trailer remain in line. When a turn is being negotiated, cable 22 will pull on spring means 21 and cause the sleeve 35 to turn on core 28, bringing the tubes 37 and the spring means 21 to a successively increasing upward angle, as the angle of the turn increases. This eases the tension of said spring means and, thereby, minimizes the torsion or twist on the hitch and bar 11.

Thus, while the tow vehicle and trailer are aligned, the present hitch provides for spring tension imposed in an upward direction to shift part of the trailer load from the rear wheels to the front wheels of the tow vehicle, and, while the tow vehicle and trailer are negotiating a turn, such tension is eased automatically in degree according to the degree of the turn.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

It will be seen from the foregoing that the constant spring pressure of my present device gives a shock absorbing or snubbing effect.

Having thus described the invention, what is claimed and desired to be secured by Letters Patent is:

1. In a hitch for connecting a trailer and its towing vehicle, a ball and socket connection directly connecting the front end of the trailer and the rear end of the vehicle, a swivel on the rear end of the vehicle and disposed on an axis inclined to the vertical, spring means having one end connected to said swivel, and adjustable means carried by said forward end of the trailer and connected to the spring means to adjust the tension thereof.

2. In a hitch for connecting a trailer and its towing vehicle, a ball and socket connection directly connecting the front end of the trailer and the rear end of the vehicle, a swivel on the rear end of the vehicle and disposed on an axis inclined to the vertical, spring means having one end connected to said swivel, and adjustable means carried by said forward end of the trailer and connected to the spring means to adjust the tension thereof, said spring means extending rearwardly from the swivel and disposed beneath said front end of the trailer, and the adjusting means applying an upward force on said spring means.

3. In a hitch for connecting a trailer and its towing vehicle, a ball and socket connection directly connecting the front end of the trailer and the rear end of the vehicle, a swivel on the rear end of the vehicle and disposed on an axis inclined to the vertical, said swivel including a sleeve rotational around said axis and provided with guide tubes on each side thereof, spring means having front ends extending into said guide tubes, and adjustable means carried by the forward end of the trailer and connected to the spring means to adjust the tension thereof.

4. In a hitch for connecting a trailer and its towing vehicle, a ball and socket connection directly connecting the front end of the trailer and the rear end of the vehicle, a swivel on the rear end of the vehicle and disposed on an axis inclined to the vertical, said swivel including a sleeve rotational around said axis and provided with guide tubes on each side thereof, spring means having front ends extending into said guide tubes, and adjustable means carried by the forward end of the trailer and connected to the spring means to adjust the tension thereof, said spring means extending rearwardly from the swivel and disposed beneath said front end of the trailer, and the adjusting means applying an upward force on said spring meeans.

5. In a trailer hitch, a swivel having its axis disposed at an angle inclined to the vertical and carried by a towing vehicle, and spring means connected to and extending rearwardly from said swivel, said spring means being adjustably connected to the trailer to vary the tension of said spring means.

6. In a trailer hitch according to claim 5: said spring means comprising a leg portion extending rearwardly from the swivel, an eye at the rearward end of said leg portion, and a shorter leg portion extending forwardly from said eye and adjustably connected to the trailer.

7. In a trailer hitch, a spring comprising two U-shaped spring bars, each bar having an eye formed therein at the rounded end, two resilient and parallel leg portions extending from each eye, one leg portion of each bar being longer than the other leg portion, a link rigidly interconnecting the shorter leg portions, said link being adapted to connect said spring to a trailer, and a swivel means interconnecting the longer leg portions, said swivel means being adapted to connect said spring to a tow vehicle.

8. In a trailer hitch according to claim 5: wherein the angle is inclined substantially 10° to the vertical, and is in a forward and downward direction.

9. In a trailer hitch, a tensioning spring comprising two side-by-side U-shaped spring bars, each bar having an eye formed therein at the rounded end, two resilient and parallel legs extending from each eye, one leg of each bar being shorter than the other leg of each said bar, said shorter legs being adjacent and thereby closer together than the longer legs, a member rigidly connecting the ends of the shorter legs and residing below and partly between the longer legs and, when pulled, moving the ends of the shorter legs toward the space between the longer legs.

10. In a trailer hitch, a tensioning spring comprising two side-by-side U-shaped spring bars, each bar having an eye formed therein at the rounded end, two resilient and parallel legs extending from each eye, one leg of each bar being shorter than the other leg of each said bar, said shorter legs being adjacent and thereby closer together than the longer legs, a member rigidly connecting the ends of the shorter legs and residing below and partly between the longer legs and, when pulled, moving the ends of the shorter legs toward the space between the longer legs, the longer legs being adapted to be connected to a towing vehicle, and means connected to the mentioned member and adapted to connect the spring to a trailer to effect tension of the spring during relative movement of vehicle and trailer.

References Cited in the file of this patent

UNITED STATES PATENTS

| | | |
|---|---|---|
| 359,863 | Harrington | Mar. 22, 1887 |
| 468,750 | McCain | Feb. 9, 1892 |
| 1,594,301 | Heymer | July 27, 1926 |
| 2,597,657 | Mathisen | May 20, 1952 |
| 2,711,908 | Saxon | June 28, 1955 |

FOREIGN PATENTS

| | | |
|---|---|---|
| 663,451 | Great Britain | Sept. 4, 1950 |